Feb. 6, 1951     G. B. ULVILD     2,540,360
PIPETTE LOADER
Filed Nov. 12, 1946
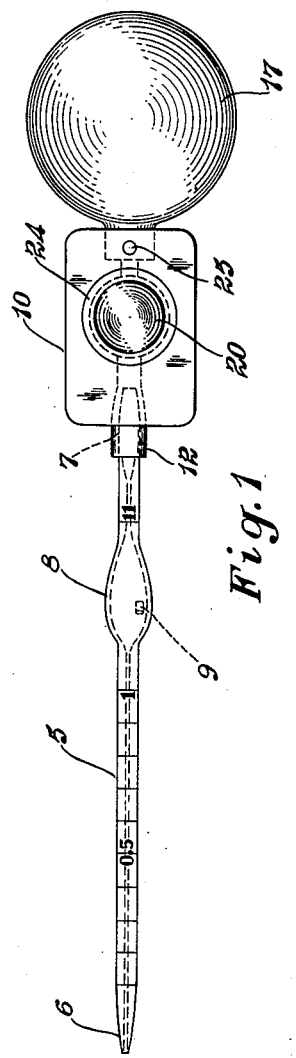
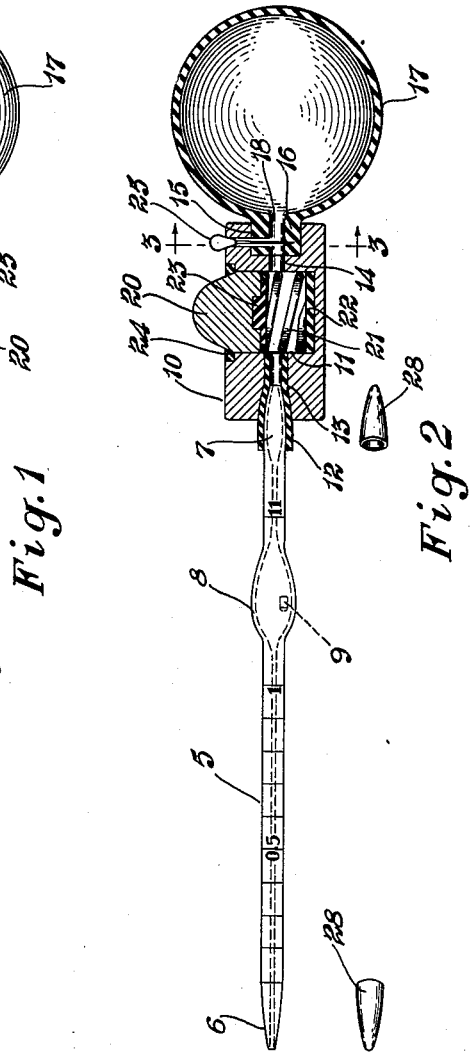
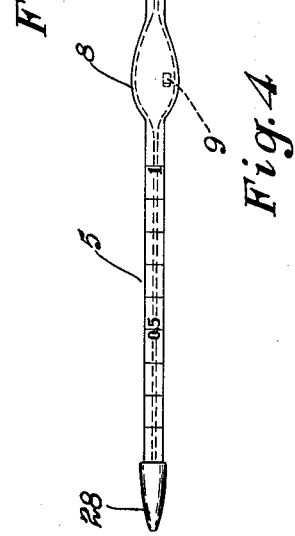
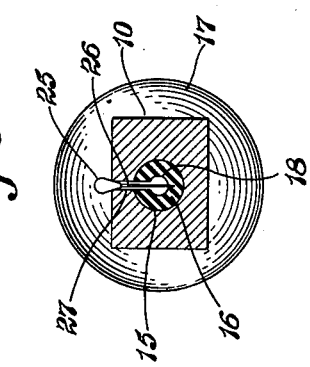
Inventor
George B. Ulvild
By Frease and Bishop
Attorneys Patented Feb. 6, 1951

UNITED STATES PATENT OFFICE 2,540,360

2,540,360
PIPETTE LOADER
George B. Ulvild, Massillon, Ohio

Application November 12, 1946, Serial No. 709,294

2 Claims. (Cl. 73—425.6)

The invention relates generally to devices for drawing a measured quantity of liquid into a tube, and more particularly to novel means for drawing a small accurately measured quantity of blood into a pipette preparatory to making a count of the blood corpuscles.

A usual method of making a blood count is to place the tip of a pipette in a drop of the blood and to suck on a flexible tube attached to the other end of the pipette sufficiently to draw the blood within the pipette up to the proper graduation. As soon as the desired amount is drawn into the pipette, the operator pinches the tube to maintain the blood in the pipette, and then immediately draws in a measured amount of a diluent and again pinches the rubber tube while shaking the pipette to mix the blood and diluent so that a specimen of the mixture may be placed under a microscope and the corpuscles counted.

Obviously, it is very difficult to obtain highly accurate measured quantities of the blood and the diluent by this method, and the degree of accuracy depends largely upon the skill of the operator. It is apparent that a very slight inaccuracy in measuring the amount of blood in the pipette will be multiplied when the blood is diluted, causing a substantial error in taking the blood count. Moreover, it is important to obtain the measured quantity of blood and properly dilute the same very rapidly to avoid coagulation.

Certain prior devices for obtaining specimens for a blood count have employed a micrometer screw adjustment for obtaining a precisely measured specimen, but the device has required a large number of parts, some of which are extremely delicate and require precision machining, and the device is awkward to handle and easily broken, while at the same time very expensive to manufacture.

It is therefore an object of the invention to provide a novel and improved pipette loading or filling device which is inexpensive to manufacture, and is adapted to be used by unskilled persons for procuring an extremely accurately measured specimen of blood for making a count of the blood corpuscles.

Another object is to provide a novel loading device which is adapted to be applied quickly and easily to the end of a standard pipette for drawing a measured quantity of blood into the pipette.

A further object is to provide a novel pipette loader which has a minimum number of parts assembled in a compact construction.

A still further object is to provide an improved pipette loader which has novel valve means for accurately controlling the amount of blood being drawn into the pipette.

Another object is to provide a novel pipette loader which has an auxiliary valve for admitting a small quantity of air to expel a slight excess of blood in order to aid in regulating the exact measured quantity obtained.

Finally, it is an object of the present invention to provide a novel and improved pipette loader for obtaining accurately measured quantities of blood specimens, which device overcomes all of the disadvantages of prior constructions.

These and other objects are accomplished by the parts, elements, constructions, arrangements and combinations which comprise the present invention, the nature of which is set forth in the following general statement, a preferred embodiment of which is set forth in the following description and illustrated in the accompanying drawing, and which is particularly and distinctly pointed out and set forth in the appended claims forming part hereof.

In general terms, the novel pipette loader preferably includes a housing having an air passageway therethrough with a rubber tube in one end for making a sealed connection with the end of a pipette and a rubber bulb communicating with the other end, there being a button valve in the housing for instantaneously closing the passageway to hold a measured quantity of blood in the pipette, and an auxiliary valve in the passageway for admitting a small amount of air into the same.

Referring to the drawing in which a preferred embodiment of the invention is shown by way of example:

Figure 1 is a plan view of the novel pipette loader attached to one end of a standard measuring pipette;

Fig. 2 is a longitudinal sectional view thereof, and showing a pair of rubber caps adapted for covering the ends of the pipette when detached from the loader;

Fig. 3 is a transverse sectional view as on line 3—3, Fig. 2; and

Fig. 4 is an elevational view of the pipette with the caps attached to the ends thereof.

Similar numerals refer to similar parts throughout the several views of the drawing.

The pipette indicated generally at 5 is of standard construction and has the tapered ends 6 and 7, and an intermediate mixing chamber portion 8 which preferably contains a mixing bead 9. The exterior of the pipette is marked with the usual graduations as shown, the designation 0.5 which is marked thereon being the graduation indicating the desired amount of blood ordinarily required for making a blood count.

In loading the pipette 5, the patient's finger is usually pricked to produce a drop of blood, and the end 6 of the pipette is then inserted in the drop while producing a vacuum within the pipette to cause the blood to enter the same, the connection to the vacuum-producing means being closed to stop the blood at the 0.5 mark. The end 6 of the pipette is then inserted in a diluent and the vacuum connection again opened to the opposite end 7 until the desired amount of diluent is obtained in the pipette. By then temporarily closing the ends of the pipette and shaking the same, the blood becomes uniformly mixed with the diluent, so that a desired quantity of the mixture can be placed beneath a microscope for counting the corpuscles.

The novel pipette loader preferably including a housing 10 which may be made of a plastic material, and the housing has a central valve chamber 11 opening through one side of the housing. A short rubber tube 12 is fitted into a bore 13 which extends from one end of the housing 10 longitudinally into the valve opening 11, and the tube 12 is adapted to fit over the end 7 of the pipette with a tight friction fit. At the other end of the housing a bore 14 communicates with the valve opening 11 and has an enlarged counterbore 15 into which the neck 16 of a rubber bulb 17 is tightly fitted for providing communication between the bore 15 and the interior of the bulb. Preferably, the neck 16 has a bore 18 which registers with the bore 14 of the housing.

A button valve 20 is slidably mounted in the valve opening 11, and is preferably held in open position by means of a helical spring 21 which is interposed between a rubber disk 22 in the bottom of the valve opening 11 and a spring centering disk 23, preferably of rubber and secured to the underside of the button 20. Preferably, a rubber retaining ring 24 holds the button 20 in the valve opening 11, and at the same time provides a tight seal between the button in normally open position.

An auxiliary valve having a head 25 is preferably located in the housing 10 between the button 20 and bulb 17, and may include a needle 26 which extends through a small passageway 27 through the housing and the neck 16 of the bulb. The head 25 is tapered as shown and is normally pushed downward so that the point of the needle is held in the rubber neck 16 and the head 25 closes the passageway 27. However, if air is desired to be introduced into the bulb while the valve 20 is closed, the tapered valve 25 may be raised with the finger nail to admit air into the bulb without disturbing the liquid in the pipette.

In the operation of the improved pipette loader, the bulb 17 is first squeezed to expel air therefrom, and while the bulb is in collapsed position, the tip end 6 of the pipette is inserted in the drop of blood from which the specimen is to be taken for counting the corpuscles therein. As the bulb 17 is released and starts to expand the vacuum created therein will draw the blood into the pipette, and instead of relying upon an inaccurate method of stopping the expansion of the bulb with the fingers, the button valve 0 is closed at the exact instant that the incoming blood reaches the 0.5 graduation. The tip end 6 of the pipette is then inserted in the diluent and the button valve opened again until the exact measured quantity of the diluent has been drawn into the pipette, whereupon the button valve 20 is again closed.

While holding the button valve 20 closed, the pipette is then detached from the tube 12 of the loader, and the end caps 28, which are preferably of rubber are then applied to the ends of the pipette, so that the pipette may be shaken to thoroughly agitate and mix the blood and diluent in the mixing chamber 8 thereof, whereupon a sample of the mixture may be placed under a microscope and the corpuscles counted.

In the operation of drawing an accurately measured quantity of blood into the pipette, if for any reason the amount of blood should slightly pass or exceed the 0.5 mark, the main valve 20 is closed and the auxiliary valve 25 may be raised slightly with the finger nail to admit air into the bulb to fill the same. Upon then releasing the valve 20 and slightly pressing the bulb 17, the additional pressure will force a very slight amount of the blood out of the tip end 6 so as to return the level of the blood to the desired graduations. Thus, the auxiliary valve 25 provides a means for accurately adjusting the quantity of the blood in the pipette when the same has slightly exceeded the desired amount.

The novel pipette loader is inexpensive to manufacture, has few parts and no fragile ones, and is easily operated by unskilled persons for procuring an exactly measured specimen of blood and mixing it with the desired exact amount of diluent for making a count of the blood corpuscles in the specimen.

The terms utilized in the foregoing specification are used for description purposes and are intended to be broadly construed; consequently no unnecessary limitations are to be implied from such terms beyond the requirements of the prior art.

Having now described the invention, the construction, operation and use of a preferred embodiment thereof, and the new and useful results obtained thereby; the novel constructions, and reasonable mechanical equivalents thereof obvious to those skilled in the art, are set forth in the appended claims.

I claim:

1. A loading device for drawing a measured quantity of liquid into a pipette, including a housing having a valve opening, a rubber pipette-attaching tube in one end of said housing communicating with said valve opening, a rubber bulb having a tubular neck fitting in the other end of said housing for providing communication between said bulb and said valve opening, a button valve operable in said opening to close off communication between the rubber tube and bulb, and an auxiliary tapered valve in said tubular neck for admitting a small amount of air into said neck, said auxiliary valve having a needle point extending across said tube and into said tube wall for securing the auxiliary valve in closed position.

2. A loading device for drawing a measured quantity of liquid into a pipette, including a housing having a central valve opening extending through one side and a longitudinal bore communicating with said valve opening, means for making a sealed connection between one end of said bore and a pipette, a rubber bulb having a sealed connection with the other end of said bore, a button valve slidable laterally in said valve opening for closing said bore, a spring under said valve for normally urging it to open position, and a rubber retaining ring for limiting opening movement of the valve and providing a seal around the valve in open position.

GEORGE B. ULVILD.

REFERENCES CITED

The following references are of record in the file of this patent:

UNITED STATES PATENTS

| Number | Name | Date |
| --- | --- | --- |
| 766,205 | Walter | Aug. 2, 1904 |
| 1,771,511 | Quelch | July 29, 1930 |
| 2,153,105 | Szecsi | Apr. 4, 1939 |
| 2,172,575 | Caulfield | Sept. 12, 1939 |
| 2,410,552 | Rosen | Nov. 5, 1946 |